Oct. 26, 1937.  L. F. CLERC  2,096,958
MEANS FOR HANDLING MERCHANDISE
Filed Jan. 14, 1935  8 Sheets-Sheet 1

Fig. 1

INVENTOR.
Leonard F. Clerc

Oct. 26, 1937.  L. F. CLERC  2,096,958

MEANS FOR HANDLING MERCHANDISE

Filed Jan. 14, 1935  8 Sheets-Sheet 8

INVENTOR.

Leonard F. Clerc

Patented Oct. 26, 1937

2,096,958

UNITED STATES PATENT OFFICE 2,096,958

MEANS FOR HANDLING MERCHANDISE

Leonard F. Clerc, Detroit, Mich.

Application January 14, 1935, Serial No. 1,625

6 Claims. (Cl. 214—16)

This invention relates to means and methods of handling merchandise and has for its principal object the provision of means for putting into practice a complete and highly efficient system of handling, storing and distributing merchandise, produce, groceries and similar commodities.

Another object of the invention is the provision of a method and means, for receiving merchandise from public or private carriers, storing said merchandise in a readily accessible manner and distributing the same to retail dealers or consumers with a minimum of manual labor, effort and expense.

Another object of the invention is the provision of a method and means for storing merchandise so that it is always accessible, easily inventoried and readily selectable for filling orders.

Another object of the invention is the provision of means for putting into practice a co-ordinated system of handling, storing and distributing merchandise.

Another object of the invention is the provision of a method and means for handling, storing and distributing merchandise whereby great economies are effected over present known methods.

Another object of the invention is the provision of a method and means for unloading simultaneously a plurality of trucks and freight cars thereby obviating the necessity of long delays between the individual operations.

The foregoing objects and other advantages of the invention will become more apparent as the description proceeds, particularly when repeated reference is made to the accompanying drawings, which form part of the disclosure, wherein:

In order that my system and method may be practiced most advantageously and effectively, I have devised and arranged a physical plant layout, together with which I have combined various pieces of apparatus and equipment for the expeditious handling of such articles as are normally handled, stored and distributed, under present practice, by inefficient means and through a great variety of loosely related, or entirely disjointed systems.

Although certain modifications are possible and within the contemplation of my invention, I have chosen the within disclosure as illustrating the preferred form of means for carrying into effect my contributions to the art.

In the accompanying drawings I have disclosed certain novel pieces of apparatus and equipment, which I claim separately in co-pending applications, it being my belief that their disclosure herein will enable those skilled in the art to obtain a more comprehensive understanding of the invention, as herein claimed.

In the accompanying drawings (Figs. 1, 2, 3 and 4), I have illustrated the typical physical layout of a single unit for practicing my invention. Any number of such units might be combined together on the same floor level, or two or more floors might be utilized, in which event the tracks, driveways and conveyor would be inclined to the proper floor level, all of which is within the contemplation of the invention.

Referring now more particularly to the drawings, it will be seen that, in the particular embodiment herein disclosed, the elements, equipment and apparatus, for practicing the invention, are housed in a conventional building 15, preferably constructed of steel, reinforced concrete and brick, which building is provided with a suitable roof 16, and doors 17 for the entrance and exit of railroad cars and vehicular traffic.

Terminating within the building (Fig. 1) is a plurality of railroad sidings 18, 19 and 20, the purposes and relations of which will appear more fully hereinafter. Extending longitudinally of said building, Fig. 1, and parallel to said railroad sidings, are driveways 21 and 22, which are adapted to accommodate trucks and wagons or other vehicles. The driveway 21 is intended for vehicles 23, with incoming merchandise, and the driveway 22 is intended for the outgoing special delivery trucks 24, hereinafter described.

Between the siding 18 and the driveway 21 and parallel thereto, is positioned a longitudinally extending raised platform 25, which is of approximately the same height as the floor of a conventional wagon or truck. Transversely positioned across the top of the platform 25 is a multiplicity of skid or container supports 26, provided with wheels or other non-friction members arranged to engage the skids 28, onto which is loaded the incoming merchandise.

Figure 11:
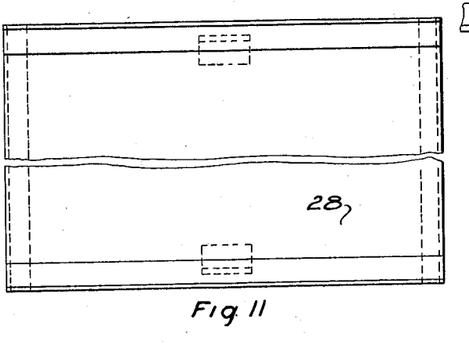
Fig. 11 is a plan view of one of the skids used in handling merchandise.
Figure 12:
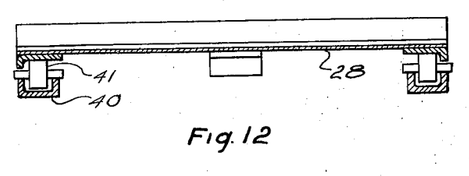
Fig. 12 is an enlarged transverse sectional view of a skid in position on the wheels of the storage rack.
Figure 13:
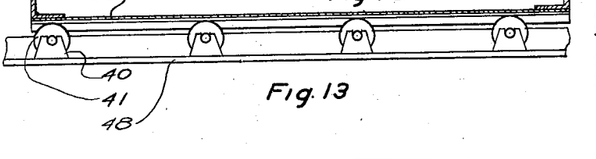
Fig. 13 is an enlarged longitudinal sectional view of a skid in position on the wheels of the storage rack.

The skids 28 (Fig. 11) are preferably stamped from a single piece of light weight metal, capable of withstanding hard usage, and are designed to accommodate miscellaneous types of merchandise. They are provided with means to prevent the shifting of merchandise thereon and are formed with means, adapted to engage the wheels, with which the storage racks and other pieces of apparatus are equipped as hereinafter described. (Figs. 5, 6, 7, 8, 9, 10.)

Movably stationed on a track 29 (Figs. 1 and 4), between the raised platform 25 and the siding 18, is a platform hoist 30, which is designed for elevating and lowering the loaded skids 28. The hoist 30 is a mobile, power driven type, with one or more power operated shelves, arranged to engage the skids 28.

Adapted to travel on the siding 18 (Figs. 1, 2), and hence to the sidings 19 and 20, special freight cars 31 are provided. The cars 31 (Figs. 1, 6) are equipped with special racks 32, made to accommodate the skids 28, and are used to transfer incoming produce and merchandise from local truck or wagon deliveries to storage, as will be more fully described hereinafter. One feature of this arrangement is that the drivers or crews of the inbound trucks and wagons, can unload their produce or merchandise directly onto the skids 28, so that the merchandise may be readily handled thereafter and easily placed in storage. The special cars 31 may also be used to make deliveries of containers filled with merchandise as hereinafter described.

Figure 8:
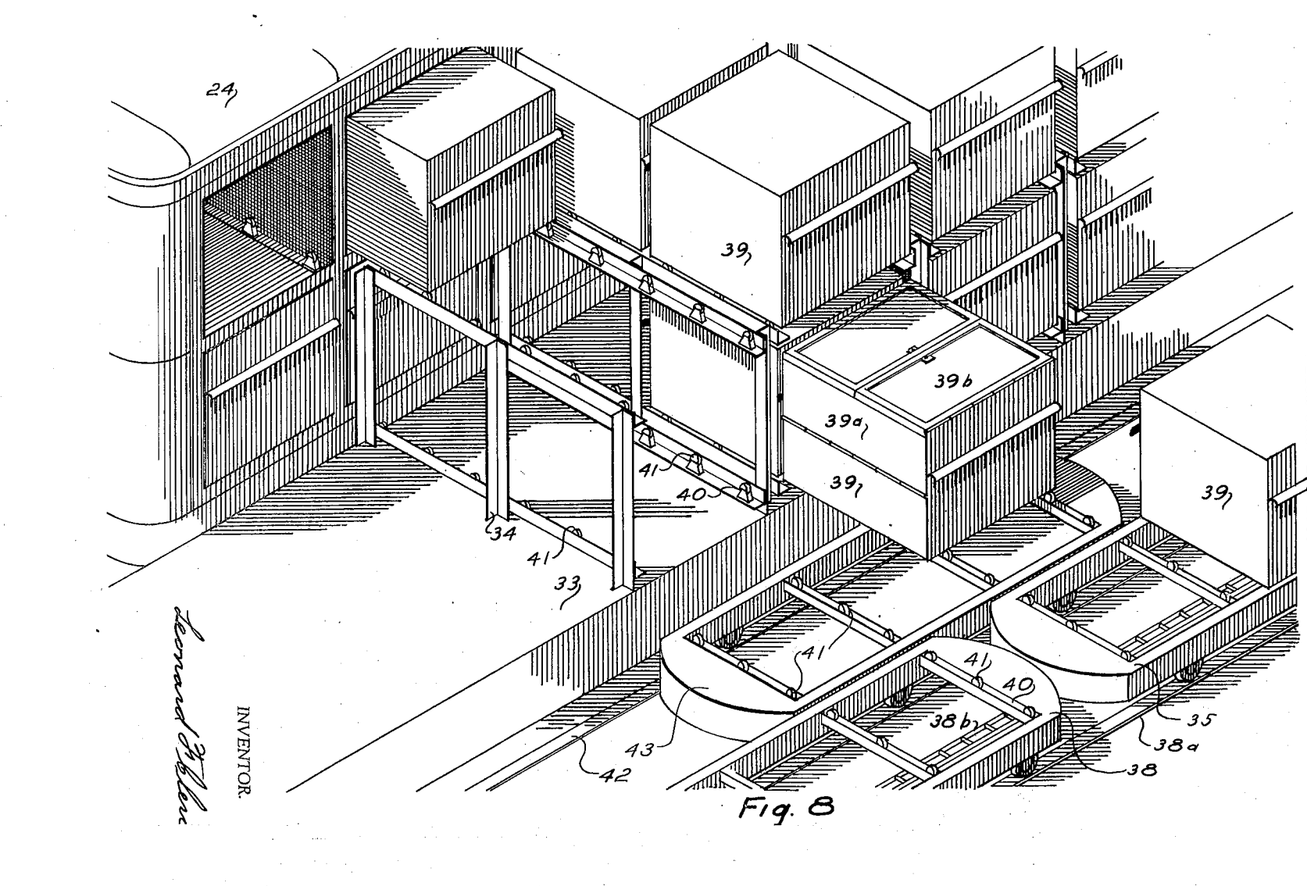
Fig. 8 illustrates the operations involved and the equipment employed in the transfer of merchandise from the conveyor to delivery trucks for distribution.

Between the outgoing driveway 22 and the siding 19 (Figs. 1, 2), which is designed for incoming car lot merchandise, and parallel thereto, is constructed a raised loading platform 33, upon which are mounted special loading racks 34 (Fig. 8). This platform is divided into zones, designating district sections, corresponding to the districts intended to be served by the distribution trucks as hereinafter described. The racks 34 comprise an open frame work having compartments arranged to receive skids 28 or containers 39 filled with merchandise as hereinafter described. From the racks 34 the skids 28 or containers 39 are loaded directly into the special outgoing delivery trucks 24. The racks 34 (Fig. 8) are fitted, at the bottom of each compartment, with wheel supports 40 and wheels 41, over which the skids 28 or containers 39 travel, when being placed into or removed from the racks 34.

A conveyor 35 (Figs. 1, 2 and 8) is arranged to travel adjacent and parallel to the loading platform 33 and the storage sections 36 and 37. The conveyor 35 is composed of a plurality of small platform type wheeled cars 38 (Figs. 7 and 8), which travel on a suitable track 38a and are power driven through a continuous link belt 38b. Each car 38 is preferably of such size as to hold two skids 28 or two merchandise containers 39 and each car 38 is equipped with wheel supports 40 and wheels 41 (Figs. 7 and 8) which are set into its top platform, so that the skids 28 or containers 39 can be moved laterally on to and off of the cars 38, with ease.

The containers 39 (Figs. 1, 7 and 8) are preferably made of metal and have the same base dimension as have the skids 28. The containers 39 (Figs. 7 and 8) are provided with hinged side panels 39a and tops 39b, together with means for locking and sealing the same when loaded for shipment. The containers 39 are handled in much the same manner as the skids 28 are handled, except that the containers 39 are employed usually in the handling and distribution of outgoing merchandise. A feature of the employment of the containers 39 for outgoing shipments is, that previously scheduled orders may be filled by the placing of goods from various sections of storage into the containers and several individual containers may be marked as part of one order, intended for a single destination.

The course run by the conveyor 35 is so arranged that merchandise from any section or position in storage may be transferred readily to the conveyor 35 and hence to the proper zone or district section of the loading platform 33.

To facilitate the transfer of the loaded containers 39, from the conveyor 35, to the loading platform 33, (Figs. 1 and 2), I provide, between the loading platform 33 and the conveyor 35 and parallel thereto, an auxiliary, narrow gauge track 42, upon which is adapted to run the side cars 43, (Fig. 8), of the platform type, each car being equipped with non-friction members 41, on its top platform, to enable the loaded containers 39 to be easily moved, laterally, on to and off of said cars 43, as the cars 43 move along the auxiliary track 42. The railroad sidings 19 and 20 are positioned parallel, and adjacent, to the storage sections 36 and 37 and are arranged for the reception of incoming merchandise, intended for storage in the building.

A platform hoist 44, (Figs. 1, 2 and 5) similar in construction to hoist 30, is adapted to travel on a track 45, which is interposed between, and parallel to, the railroad siding 19 and the storage section 36, and is arranged to receive skids 28, loaded with merchandise, from the box cars 46 and transport them to their proper positions in the racks 47, of the storage section 36. The storage section 36 may be partitioned into stock rooms for the use of manufacturers or producers who desire to maintain and control their own storage service.

The storage racks 47 (Figs. 5, 6, 7, 9 and 10) consist of a framework of angle iron, secured together by any suitable means, and are arranged to receive the loaded skids 28 or containers 39, and are so constructed as to accommodate the storage of such loaded skids 28 or containers 39 in tiers. The horizontal members 48, (Figs. 5, 6, 7 and 9) of each tier, are declined slightly from the receiving side 49, to the discharging side 50 and are provided with wheels 41, or similar means, to permit the movement of the skids 28, or containers 39 by gravity, from the receiving side 49 to the discharging side 50, where they are held by suitable means (not shown) until removed. At the discharge side 50, (Figs. 7 and 9) of each section of the racks 47, I provide lowering platforms 51, which are arranged to travel vertically in guides 52 provided therefor. The platforms 51 are lowered by gravity, controlled by counterweights 52a, or other means, as described and claimed in my co-pending application, or they may be lowered by means of an overhead power hoist (not shown). By these means a loaded skid 28 or container 39 may be removed from the upper tiers and lowered to a position, where it can be readily placed on the conveyor 35 for conveyance to the shipping station 33.

Positioned under the lower tier of the racks 47 (Figs. 5, 6, 7 and 9) and declined from the discharge side 50 to the receiving side 49, are skid return members 53, equipped with wheel supports 40 and wheels 41, or similar means, to permit the empty skids 28 to be returned by gravity to the receiving side 49, of the racks 47, for refilling. The skids 28 employed in the foregoing operations are of uniform size and capacity and are designed to accommodate all kinds of miscellaneous merchandise.

Because of the uniformity in size and capacity of the skids 28 and the containers 39, it is possible to readily determine, control and regulate the volume of each kind of merchandise placed in storage and thus make possible a uniform and orderly storage and handling of such merchandise throughout all operations. By such practice it is possible to standardize all apparatus and equipment, so that the handling, storing and sorting of merchandise may be accomplished in a well regulated manner, thereby preventing the losses which follow from the haphazard and irregular methods, heretofore practiced.

The storage section 37 (Figs. 1 and 2), is an enclosed portion intended for the cold storage of perishable goods requiring controlled temperatures. It is of conventional design, except that it is equipped with racks 55, similar to the racks 47, for receiving and discharging loaded skids 28 or containers 39 as described above. The position of the racks 55, however, is reversed from that of the racks 47, in order that the discharge side of racks 55 will be adjacent the conveyor 35. The loaded skids 28 or containers 39 are placed in the racks 55, through aligned doors 56, positioned in the wall 57 adjacent the receiving side, and are taken from the racks 55 and removed from the storage section 37, through the doors 58, in the wall 57a adjacent the conveyor 35.

Cars 31 are unloaded from the siding 20 to the cold storage racks 55, by means of the platform hoist 59, which is similar in construction and operation to the hoists 30 and 44 hereinabove referred to and which is adapted to travel on track 59a.

I have devised certain special pieces of equipment for use in handling the skids 28 and containers 39, hereinabove referred to, one of which is utilized to facilitate the unloading of standard type box cars. The unit referred to consists of a turn-table section 60 (Fig. 5) to which may be attached, by suitable means, the straight sections 61. This equipment is designed to be placed within a freight car and serves as a track over which the loaded skids 28 or containers 39 may be moved with minimum effort. As fast as the goods are removed, additional sections 61 are laid, until the ends of the car are reached and all of the goods are removed. The sections 61 are preferably integral stampings of some durable metal and light enough in weight so that one man can easily handle one of them at a time. Each section 61 is provided with wheels, or similar means, over which the skids 28 or containers 39 may pass with a minimum of resistance. The turntable section 60 permits the loaded skids 28 or containers 39 to be received from one direction and discharged from another. This equipment is the subject matter of a co-pending application and disclosed herein only for the purpose of pointing out its function in connection with the within invention.

The operations of the equipment and apparatus used in practicing my invention may be divided into three general classes and will be described in order as follows:

(a) Receiving merchandise from local delivery and transferring it to storage.

(b) Receiving merchandise from long distance delivery, in standard freight cars, and transferring it to storage.

(c) Removing merchandise from storage, classifying it, and placing it on the conveyor for transportation to the shipping platform, and thence to the delivery trucks or special cars for distribution.

In the handling operations, hereinabove referred to, in class (a), the merchandise arrives by local deliveries and is received at the receiving platform 25 and is removed from the vehicle by hand and placed on the skids 28, which have already been positioned on the platform 25 so as to engage the wheels 41. The loaded skids 28 are then moved over the wheels 41 onto the mobile platform hoist 30, which elevates the skids 28 to the desired height and moves them into position, along side the box car 31, so that the loaded skids 28 can be inserted into the desired compartment in the racks 32 with which the car is equipped. If the merchandise is not of a perishable nature the car 31 is switched into position on track 19, so that the merchandise may be unloaded into the racks 47, in storage section 36, by means of the mobile platform hoist 44. If the merchandise is of a perishable nature the car 31 is switched into position on track 20, where it may be unloaded into the cold storage racks 55 of section 37, by means of the mobile platform hoist 59. When once in the racks 47 and 55 the skids 28 will travel by gravity over the wheels 41, set in the racks, and take up positions back of previously placed skids, or will travel to the discharge end of the racks, ready for the later operations in the removal of goods from storage. It will be understood that in the operation just described, the containers 39 may be substituted in place of the skids 28.

Figure 1:
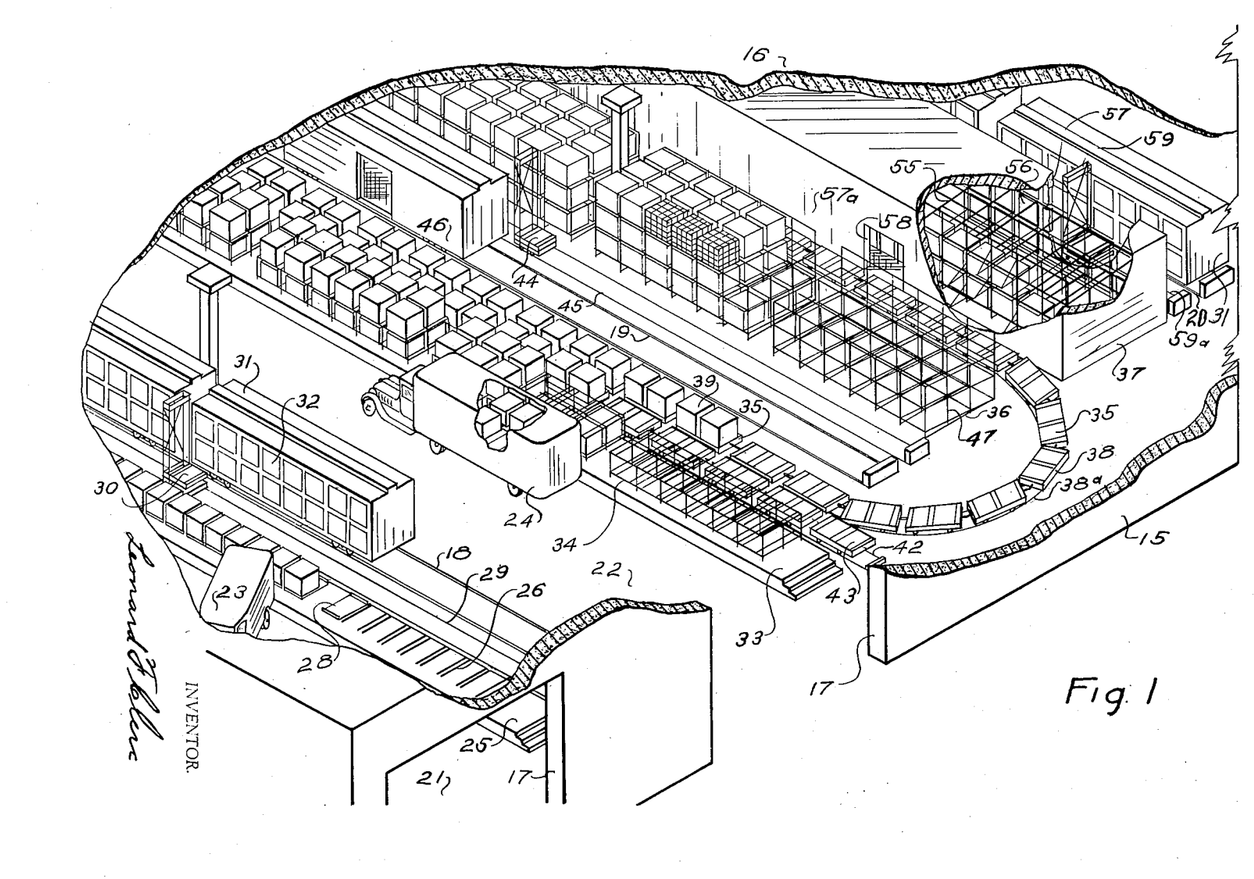
Fig. 1 is a fragmentary view of a building, with parts broken away showing, in perspective, the arrangement of the elements, apparatus and equipment employed in practicing my invention.
Figure 2:
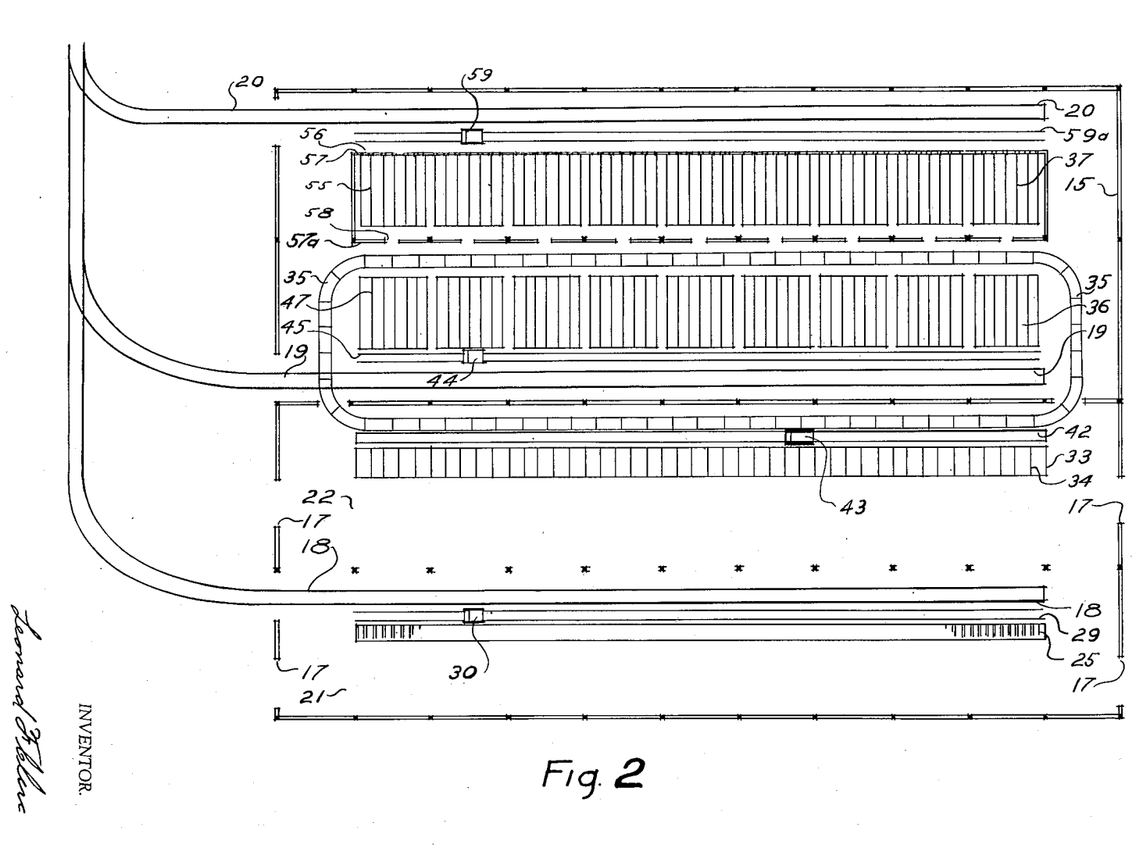
Fig. 2 is a plan view looking from left to right in Fig. 1, showing the relation to one another, of the principal pieces of apparatus and equipment illustrated in Fig. 1.
Figures 3, 4:
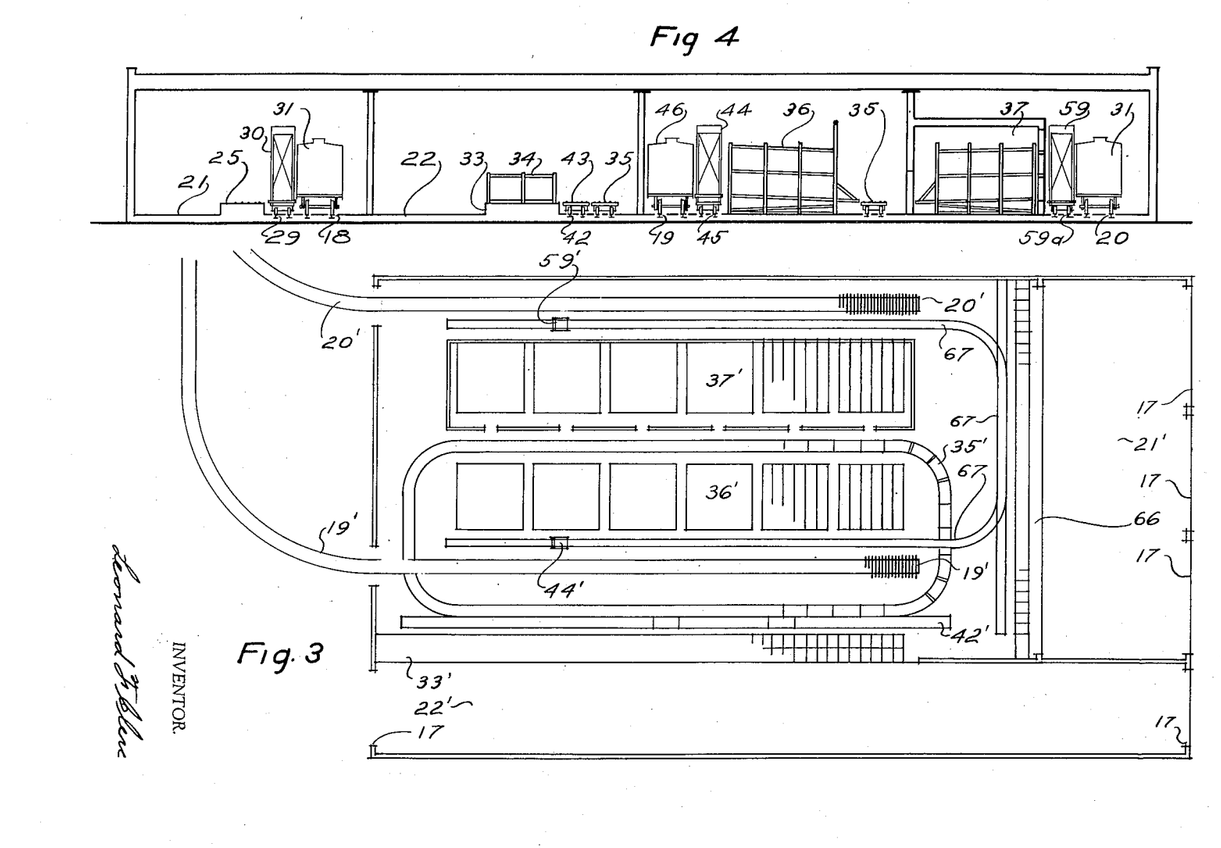
Fig. 3 is a plan view of a modified form of arrangement wherein the skid dock for incoming merchandise is positioned across the end of the building instead of along one side as shown in Figs. 1 and 2.
Fig. 4 is a transverse section of the building, elements and equipment illustrated in Fig 1.

In Fig. 3 I disclose a modified form of arrangement wherein the receiving platform or skid dock 66 and the runway 21' are positioned at the end of the building instead of along one side as shown in Figs. 1, 2, and 4. In this modification, the lift hoists 44' and 59' are made to travel on tracks 67, adjacent the receiving platform 66 and the storage sections 36' and 37'. In this embodiment, the skids 28 or containers 39 may be loaded onto the mobile hoists 44' and 59' and moved directly along the track 67 to positions of registry with the racks of the storage sections 36' and 37'. In this modification, the sidings 19' and 20', the conveyor 35', the auxiliary side car track 42' and the loading platform 33' and the runway 22' are in the same relative position as the elements indicated by similar numerals without their primes, as shown in Figs. 1 and 2, and perform the same functions as ascribed to them hereinafter.

Figure 5:
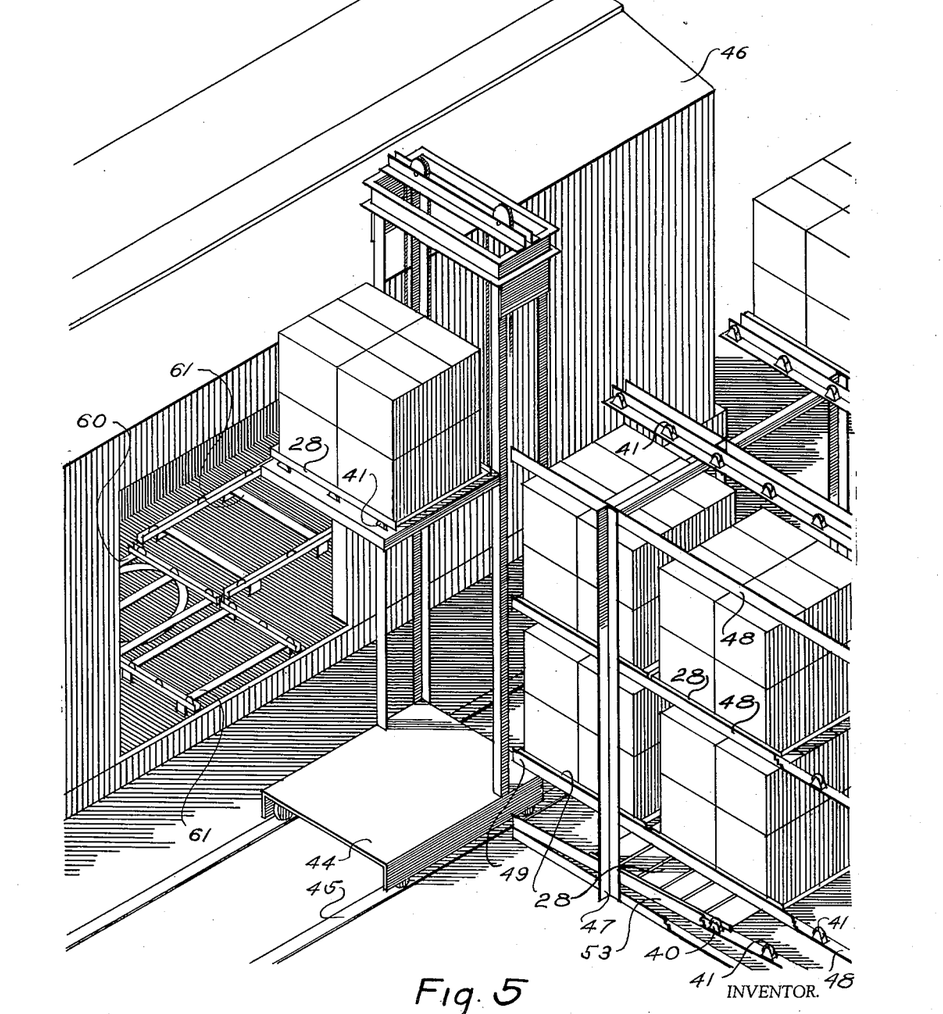
Fig. 5 illustrates the operations involved and the elements and equipment employed in the unloading of merchandise, from a standard type freight car, and placing it in storage.
Figure 6:
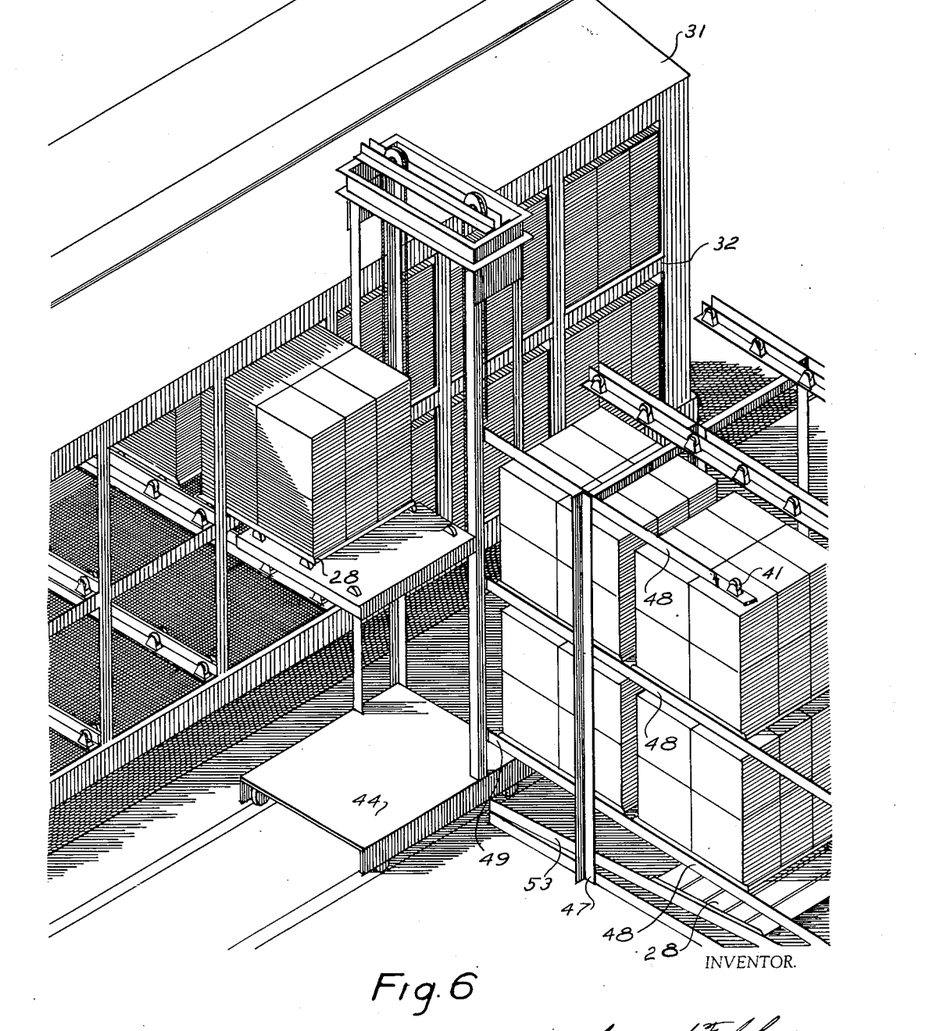
Fig. 6 illustrates the operations involved and the elements and equipment employed in the unloading of merchandise from a special type freight car to the storage racks.
Figure 7:
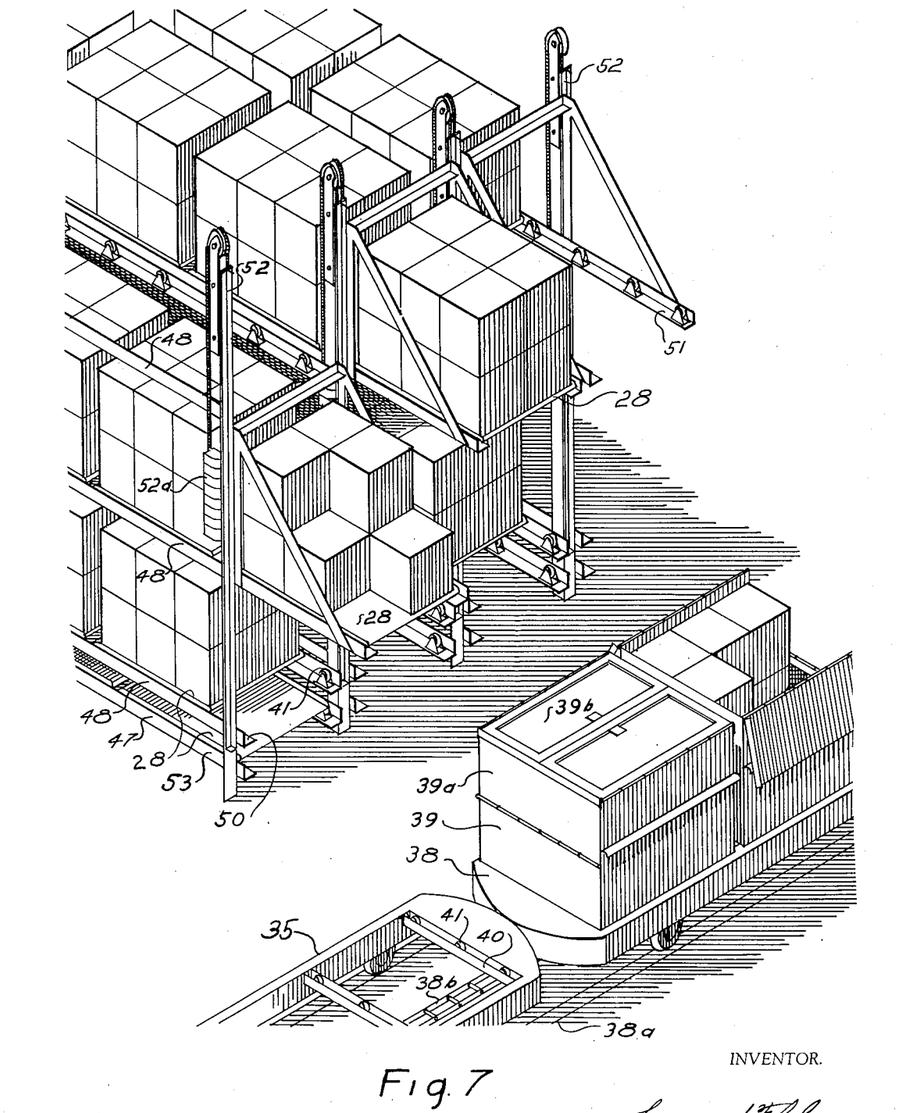
Fig. 7 illustrates the operations involved and the equipment employed in the transfer of merchandise from the storage racks to the conveyor.

In the operations referred to in class (b), the merchandise intended for storage is received, usually in standard type freight cars 46, which are positioned on tracks 19, or tracks 20, adjacent the storage sections 36 or 37. As soon as practical, the skid handling turntable 60 and sections 61 are placed inside the freight cars 46 (Fig. 5). An empty skid 28 is placed on the section 61, loaded with merchandise and then moved over the wheel equipped section 61 to the turntable 60, where its direction of travel is changed to permit the loaded skid 28 to be moved through the car door on wheel equipped section 61, where it is rolled onto the mobile platform hoist 44, elevated or lowered to the desired level, and moved into registering position with an opening in the storage racks 47. The loaded skid 28 is then moved across the wheels 41 positioned on the platform hoist and into the rack 47. Once in the rack 47, the loaded skid 28 will travel by gravity over the wheels 41 of the rack 47 and take up a position back of a previously placed skid 28, or will travel to the discharge end 50 of the rack 47 to await the later operations in the removal of goods from storage. It will be understood that in the foregoing operations, the containers 39 may be used instead of the skids 28. When merchandise is received in barrels, the use of skids 28 or containers 39 may be dispensed with entirely, as I have designed a special barrel rack (not shown) to handle barrels by gravity, in practically the same manner as the skids or containers are handled.

Figure 9:
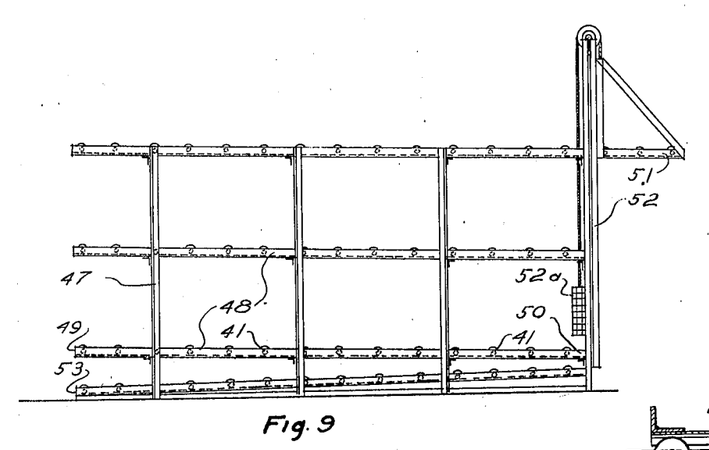
Fig. 9 is a side elevation of one of the racks used for storing merchandise.
Figure 10:
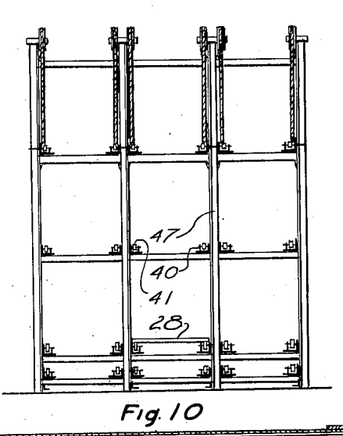
Fig. 10 is an end view of the storage rack illustrated in Fig. 9.

In the operations designated as class (c), the merchandise, required for previously scheduled orders, is first removed from the various stock rooms or cold storage compartments. If the merchandise is stored in the racks 47, on skids 28 (Fig. 7) the loaded skids 28 are released and lowered to the desired level by means of the lowering platforms 51, provided at the discharge end 50 of each rack 47. The required merchandise is then removed from the skids 28, placed on the conveyor 35, in the containers 39, which are marked for a specific zone destination, and provided to be sealed if desired. The empty skids are then returned to the loading side 49 of the racks 47 by means of the skid return 53 (Fig. 9). If the merchandise be stored in the containers 39, the loaded containers may be placed directly on the conveyor without disturbing the contents. The loaded containers 39 travel on the conveyor 35 toward the shipping platform 33, which is divided into zones, and when the containers 39 arrive opposite the respective zones, for which they are marked, they are removed laterally from the conveyor 35 to the roller equipped side cars 43 (Fig. 8) and hence into the loading racks 34, from whence they are rolled into the delivery trucks 24, which are similarly provided with wheel equipped racks, and carried to their final destination for distribution.

There may be occasions when it might become necessary or desirable to reverse the operations hereinabove described, or to use the receiving stations as shipping stations and the shipping stations as receiving stations, all of which is within the contemplation of the invention, and intended to be covered by the claims. From the foregoing description it will be appreciated that a complete and efficient merchandise handling system is provided, under which an orderly method of handling and storage is developed to expeditiously receive goods from various sources for storage, to store such goods safely and with a minimum of shifting and handling, to segregate perishable and unperishable goods requiring different types of storage, to have all goods so arranged while in storage that all or any part is readily accessible for outgoing shipment, and finally that the method of shipment is uniformly controlled to meet the varied requirements of orders received and the efficient release of these orders for distribution to meet the requirements of the trade.

Throughout the operations under this system, it is evident that the manual operations in the handling of merchandise have been reduced to a minimum. However, in accomplishing this feature, the mechanical and power driven pieces of equipment and apparatus have been so placed that each piece serves for varied uses throughout extensive runs in the operations, and as a result, undue duplications of pieces of equipment have been avoided. Additional items of equipment and extensions to the stationary parts would be varied only as the conditions of a given site for a building might require. Under variations of this sort the general method of handling, as hereinbefore outlined, would be maintained so that the accomplishments of the system would be unaltered.

Although I have hereinabove described certain embodiments of my invention, it will be understood that certain modifications can be effected in the arrangement and combination of the elements, so that the objects of the invention may be carried out, all of which is within the scope of and intended to be covered by the appended claims.

Having described my invention, what I claim and desire to secure by Letters Patent is:

1. Means for handling merchandise comprising the combination of a plurality of receiving stations, a plurality of storage racks, comprising a multiplicity of elongated declining compartments, having non-friction elements in their bases, a lowering platform associated with each stack of compartments, a runway associated with each stack of compartments and declined oppositely thereto, means between one or more of said receiving stations and said storage compartments for moving said merchandise vertically and horizontally into registry with said storage compartments, one or more shipping stations and a conveyor arranged to travel adjacent said storage compartments and said shipping station or stations.

2. Means for handling merchandise comprising the combination of a plurality of receiving stations, a plurality of storage racks, comprising a multiplicity of elongated declining compartments, having non-friction elements in their bases, a lowering platform associated with each stack of compartments, a runway associated with each stack of compartments and declined oppositely thereto, means between one or more of said receiving stations and said storage compartments for moving said merchandise vertically and horizontally into registry with said storage compartments, one or more shipping stations and a conveyor arranged to travel adjacent one or more of said receiving stations, said storage compartments and said shipping station or stations.

3. Means for handling merchandise comprising the combination of a plurality of receiving stations, a plurality of storage racks, comprising a multiplicity of elongated compartments, open at either end and declined from their receiving to their discharging ends, means between the aforesaid receiving stations and said storage racks for moving said merchandise vertically and horizontally into registry with said storage compartments, one or more shipping stations, each station comprising an elongated raised dock, a conveyor arranged to travel adjacent said storage racks and said raised dock or docks, means on said raised docks for receiving containers, loaded with merchandise, from said conveyor and loading them into delivery vehicles, and means positioned between said conveyor and said raised dock or docks for transferring containers, loaded with merchandise, from said conveyor to said raised dock or docks.

4. Means for handling merchandise comprising the combination of a plurality of receiving stations, a plurality of storage racks, comprising a multiplicity of elongated compartments, open at either end and declined from their receiving to their discharging ends, means between the aforesaid receiving stations and said storage racks for moving said merchandise vertically and horizontally into registry with said storage compartments, one or more shipping stations, each station comprising an elongated raised dock, a conveyor arranged to travel adjacent one or more of said receiving stations, said storage racks, and said raised dock or docks, means on said raised docks for receiving containers, loaded with merchandise, from said conveyor and loading them into delivery vehicles, and means positioned between said conveyor and said raised dock or docks for transferring containers, loaded with merchandise, from said conveyor to said raised dock or docks, and vice versa.

5. Means for handling merchandise comprising the combination of a plurality of receiving stations, a plurality of storage racks, comprising a multiplicity of elongated compartments, open at either end and declined from their receiving to their discharging ends, means between the aforesaid receiving stations and said storage racks for moving said merchandise vertically and horizontally into registry with said storage compartments, one or more shipping stations, each station comprising an elongated raised dock, an endless conveyor arranged to travel adjacent said storage racks and said raised dock or docks, means on said raised dock for receiving containers loaded with merchandise, from said conveyor and loading them into delivery vehicles, and means positioned between said conveyor and said raised dock or docks for transferring containers, loaded with merchandise, from said conveyor to said raised dock or docks, said last named means comprising a plurality of mobile platform cars having anti-friction members positioned on top thereof.

6. Means for handling merchandise comprising the combination of a plurality of interconnecting railroad sidings, cars equipped with racks and adapted to travel on said sidings, an incoming vehicular runway adjacent and parallel to one of said sidings, a raised dock, between said incoming vehicular runway and said last named siding, means on said raised dock for moving loaded merchandise containers across said dock, means associated with said dock for moving said merchandise containers vertically and horizontally into registry with the racks carried by said cars, when the latter are on said last named siding, a plurality of storage racks, adjacent one or more of said sidings, one or more shipping docks, an outgoing vehicular runway adjacent one of said shipping docks and a conveyor arranged to travel adjacent said storage racks and one or more of said docks.

LEONARD F. CLERC.